July 10, 1951   M. J. HERZBERGER   2,559,875
WIDE ANGLE CORRECTED PHOTOGRAPHIC OBJECTIVE COMPRISING
FOUR MENISCUS COMPONENTS IN AXIAL ALIGNMENT
Filed Dec. 21, 1949                    2 Sheets-Sheet 1

FIG. 1.

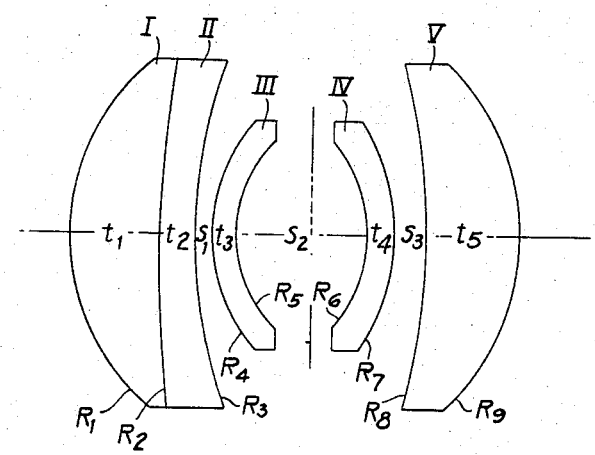

FIG. 2.

| EF = 100mm. | | | | f/4.0 |
|---|---|---|---|---|
| LENS | N | V | RADII | THICKNESSES |
| I | 1.498 | 67.0 | $R_1$ = +20.2 mm | $t_1$ = 8.3 mm. |
| II | 1.620 | 60.3 | $R_2$ = +103.6 | $t_2$ = 3.1 |
| | | | $R_3$ = +47.1 | $S_1$ = 1.5 |
| III | 1.720 | 29.3 | $R_4$ = +16.3 | $t_3$ = 2.2 |
| | | | $R_5$ = +11.9 | $S_2$ = 12.6 |
| IV | 1.720 | 29.3 | $R_6$ = −13.0 | $t_4$ = 2.8 |
| | | | $R_7$ = −18.5 | $S_3$ = 2.9 |
| V | 1.498 | 67.0 | $R_8$ = −70.8 | $t_5$ = 8.6 |
| | | | $R_9$ = −21.3 | BF = 75.0 |

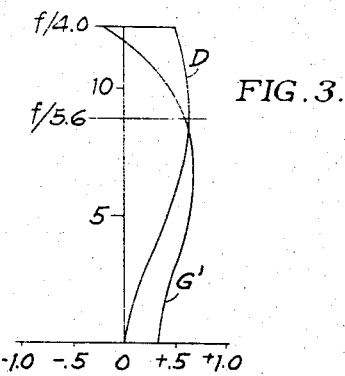

FIG. 3.

MAXIMILIAN J. HERZBERGER
INVENTOR
Daniel J. Mayne
BY Harold F. Bennett
ATTORNEY & AGENT July 10, 1951          M. J. HERZBERGER                2,559,875
        WIDE ANGLE CORRECTED PHOTOGRAPHIC OBJECTIVE COMPRISING
              FOUR MENISCUS COMPONENTS IN AXIAL ALIGNMENT
Filed Dec. 21, 1949                                 2 Sheets-Sheet 2

FIG. 4.

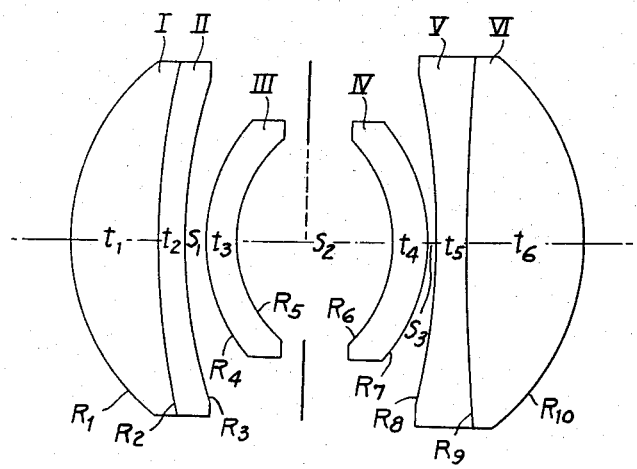

FIG. 5.

| EF = 100mm. | | | | f/4.0 |
|---|---|---|---|---|
| LENS | N | V | RADII | THICKNESSES |
| I | 1.505 | 66.2 | $R_1$ = + 21.0mm. | $t_1$ = 8.3 mm. |
| II | 1.620 | 60.3 | $R_2$ = + 84.4 | $t_2$ = 2.2 |
| | | | $R_3$ = + 48.5 | $S_1$ = 2.0 |
| III | 1.751 | 27.7 | $R_4$ = + 16.5 | $t_3$ = 2.7 |
| | | | $R_5$ = + 12.0 | $S_2$ = 14.7 |
| IV | 1.751 | 27.7 | $R_6$ = − 12.8 | $t_4$ = 3.1 |
| | | | $R_7$ = − 16.9 | $S_3$ = 0.4 |
| V | 1.670 | 47.2 | $R_8$ = − 76.2 | $t_5$ = 3.0 |
| VI | 1.505 | 66.2 | $R_9$ = +306. | $t_6$ = 11.0 |
| | | | $R_{10}$ = − 22.2 | BF = 76.4 |

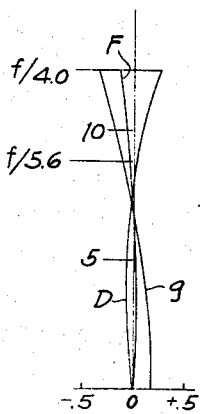

FIG. 6.

MAXIMILIAN J. HERZBERGER
                    INVENTOR
           Daniel J. Mayne
BY    Harold F. Bennett
           ATTORNEY & AGENT Patented July 10, 1951

2,559,875

UNITED STATES PATENT OFFICE 2,559,875

WIDE ANGLE CORRECTED PHOTOGRAPHIC OBJECTIVE COMPRISING FOUR MENISCUS COMPONENTS IN AXIAL ALIGNMENT

Maximilian J. Herzberger, Rochester, N. Y., assignor to Eastman Kodak Company, Rochester, N. Y., a corporation of New Jersey Application December 21, 1949, Serial No. 134,254

6 Claims. (Cl. 88—57)

This invention relates to photographic objectives of the type comprising two inner negative meniscus components concave toward each other and two outer positive meniscus components concave toward the inner components.

The object of the invention is to provide objectives of this type covering a wide angular field and highly corrected for zonal spherical aberration and variation of spherical aberration with color, or so-called spherochromatism, whereby the objectives may be used at a larger aperture than previously known wide-angle objectives while still rendering sharp detail in the image.

Objectives of this type have been found very useful as wide-angle lenses covering a field of ±30° to 45°, and when designed especially for this purpose usually consist of four simple lens elements, although it is known to divide one of the positive components into two positive elements enclosing a very small airspace. The two halves of the objective are usually made slightly unsymmetrical to correct the coma for distant objects, and it is known to add a substantially plane-parallel plate behind the objective or a pair of plates arranged symmetrically in front of and behind the objective to aid in controlling the coma and distortion. Sometimes a comparatively large negative component is added in front of the main body of the objective to increase the angular field.

Although some prior objectives of this type are highly satisfactory for use at apertures of about f/6.3, a higher relative aperture is highly desirable, particularly if the lens is to be used under unfavorable lighting conditions, and is useful even at a slight sacrifice of angular field coverage.

According to the present invention, an objective of the above described type is made up in which the front positive component is compound and consists of a positive element of relatively lower refractive index cemented to a negative element of relatively higher refractive index so arranged that the negative element faces the adjacent negative component, the curvature of the cemented surface being between $-1/F$ and $+2/F$, where F is the focal length of the objective and where the negative and positive values indicate curvatures respectively convex and concave toward the diaphragm. Preferably, the rear positive component also has this structure.

I have discovered that the zonal spherical aberration and the spherochromatism can be completely corrected and even slightly over-corrected by making one or both of the positive components compound in this manner, thus permitting a much larger relative aperture with only a slight reduction in angular field. The zonal spherical aberration is controlled chiefly by varying the refractive index difference at the cemented surface or surfaces and the radius of curvature thereof. The sphero-chromatism is controlled by varying the dispersions of the elements forming the cemented surface or surfaces and to a lesser degree by the radius of curvature of the cemented surface.

To keep these aberrations near the optimum state of correction, the refractive indices of the two cemented elements should differ by between 0.08 and 0.25 and the dispersive indices or V-values should differ on the average by less than ±30%.

The ordinary aberrations are corrected in the usual way. I have found it favorable for good corrections over a wide angular field to shape the positive components so that their thicknesses are between 0.05F and 0.2F, the radii of curvature of their convex surfaces are between 0.16F and 0.3F, and those of their concave surfaces are between 0.4F and F, and to shape the negative components so that their thicknesses are between 0.01F and 0.05F, the radii of curvature of their convex surfaces are between 0.13F and 0.28F, and those of their concave surfaces are between 0.10F and 0.20F, and to space the negative components from the respective positive components by between zero (i. e. in contact therewith) and 0.05F and from each other by between 0.08F and 0.20F.

Each of the two positive components has one positive element, of course, regardless of whether one or both are made compound in accordance with the invention. I have found it advantageous for each of these two positive elements to have a refractive index between 1.43 and 1.58 and a dispersive index between 50 and 80. Also, it is important for primary color correction that the negative components, which are preferably simple elements, have low dispersive indices, preferably between 25 and 36. Known glasses in this range of dispersions have refractive indices from about 1.6 to about 2.0. These high refractive indices are also favorable for reducing the zonal spherical aberration and so aid in attaining the objects of the invention.

In the accompanying drawings:

Figs. 1 and 4 show two objectives according to the invention.

Figs. 2 and 5 give data for a practical example of each form, and

Figs. 3 and 6 show aberration curves for the two examples.

Each objective in Figs. 1 and 4 is made up of four meniscus components, two negative ones between two positive ones, all four of which are concave toward the central airspace where the diaphragm is located, and the front one of which is compound and consists of a front positive element and a rear negative element cemented thereto in accordance with the invention. In the objective shown in Fig. 4 the rear component also is similarly compounded and consists of a front negative element and a rear positive element cemented thereto, thus carrying out the principles of the invention in both positive components. The negative components are simple elements in both examples.

Figures 2 and 5 are tables of specifications for an objective of each of the forms shown in Figs. 1 and 4. In each case the lens elements are numbered in order from front to rear in the first columns and the corresponding refractive indices N for the D line of the spectrum and the dispersive indices V are given in the second and third columns. In the last two columns are given the radii of curvature R, the thicknesses $t$ of the elements, and the spaces $s$ between components, each numbered by subscripts from front to rear. The + and − values of the radii denote surfaces respectively convex and concave to the front of the objective. The focal length in each case is 100 mm. These tables are repeated below.

*Examples 1, Figs. 1 and 2*

| Lens | N | V | Radii | Thicknesses |
|---|---|---|---|---|
| I | 1.498 | 67.0 | $R_1=+20.2$ mm. | $t_1=8.3$ mm. |
| II | 1.620 | 60.3 | $R_2=+103.6$ | $t_2=3.1$ |
|  |  |  | $R_3=+47.1$ | $s_1=1.5$ |
| III | 1.720 | 29.3 | $R_4=+16.3$ | $t_3=2.2$ |
|  |  |  | $R_5=+11.9$ | $s_2=12.6$ |
| IV | 1.720 | 29.3 | $R_6=-13.0$ | $t_4=2.8$ |
|  |  |  | $R_7=-18.5$ | $s_3=2.9$ |
| V | 1.498 | 67.0 | $R_8=-70.8$ | $t_5=8.6$ |
|  |  |  | $R_9=-21.3$ | $BF=75.0$ |

*Example 2, Figs. 4 and 5*

| Lens | N | V | Radii | Thicknesses |
|---|---|---|---|---|
| I | 1.505 | 66.2 | $R_1=+21.0$ mm. | $t_1=8.3$ mm. |
| II | 1.620 | 60.3 | $R_2=+84.4$ | $t_2=2.2$ |
|  |  |  | $R_3=+48.5$ | $s_1=2.0$ |
| III | 1.751 | 27.7 | $R_4=+16.5$ | $t_3=2.7$ |
|  |  |  | $R_5=+12.0$ | $s_2=14.7$ |
| IV | 1.751 | 27.7 | $R_6=-12.8$ | $t_4=3.1$ |
|  |  |  | $R_7=-16.9$ | $s_3=0.4$ |
| V | 1.670 | 47.2 | $R_8=-76.2$ | $t_5=3.0$ |
| VI | 1.505 | 66.2 | $R_9=+306$ | $t_6=11.0$ |
|  |  |  | $R_{10}=-22.2$ | $BF=76.4$ |

Figs. 3 and 6 are graphs showing the spherical aberration of the objectives for which data is given in Figs. 2 and 5 respectively. Each graph shows the spherical aberration of a fan of rays which are parallel to the axis when they enter the front of the objective. The ordinate gives the height of the entering ray (the corresponding relative apertures are also indicated), and the abscissa gives the spherical aberration of the ray as measured along the axis from the paraxial focus for the "D" wavelength. The full curve D shows the aberration for the D wavelength, and the broken curve shows the spherical aberration for the G' wavelength in one case and the g wavelength in the other. There is no significance in this difference; the two wavelengths are nearly the same, and one happened to be used in the first example and the other in the second.

It will be noted from Fig. 3 that the zonal spherical aberration and the spherochromatism are both overcorrected in Example 1. That is, the f/5.6 aberration for D has a greater plus value than one-half the f/4 aberration, and the G' rays are less overcorrected than the D. A sample lens was made up and it proved a great advance over the prior art. However, it appeared that less overcorrection of the zonal aberration would be even better, and so Example 2 was designed in which, as seen in Fig. 6, the zonal aberration is very slightly undercorrected. This gave a further improvement and proved to be very near the optimum residual for this aberration in this type of lens.

In both examples the curvature of the cemented surface or surfaces is within the range from −1/F (convex toward the diaphragm) through plano to +2/F (concave toward the diaphragm), and the refractive index of the negative element in each compound positive component is higher than that of the positive element by between 0.08 and 0.25 in accordance with these features of the invention. In Example 1 the curvature $1/R_2$ is +0.965 and the index difference $(N_1-N_1)$ is 0.122. In Example 2, the curvature $1/R_2$ is +1.185 and the curvature $-1/R_9$ is −0.327, and the index differences are 0.115 and 0.165, respectively. The V-values differ by 10%, 9%, and 29% of the V-value of the positive element in these three compound components.

It is directly apparent from the above tables that all the radii of curvature of the glass-air surfaces and also the thicknesses, spaces, and refractive and dispersive indices are within the preferred range for objectives according to the invention.

It may be pointed out that although it is preferred that the negative components be simple elements, it may be useful in some instances to make them compound, for example as hyperchromatic doublets of crown and short flint to aid in correcting secondary color. Also, since the objects of the invention are attained chiefly by the front component being compound in the specified manner, it may be found preferable to use different arrangements of elements in the rear component to further improve the oblique spherical aberration (i. e. the rim rays and skew rays) or the zonal astigmatism, and such variations as well as the above-described variations known in the prior art are considered as being within the broad form of the invention.

I claim:

1. A photographic objective comprising two negative meniscus inner components concave toward each other and enclosing a central airspace and diaphragm therein and two positive meniscus outer components concave toward the negative components and all axially aligned and airspaced apart, characterized by the front positive component being compound and consisting of a negative element facing the negative components and a positive element cemented thereto, by the curvature of the cemented surface so formed being between −1/F and +2/F where F is the focal length of the objective and where the − and + values indicate curvatures respectively convex and concave toward the negative components, and by the refractive index of the negative element being greater than that of the positive element by between 0.08 and 0.25 and its dispersive index being between 70% and 130% of that of the positive element.

2. An objective according to claim 1 in which each positive component is between 0.05F and 0.2F thick at the axis, the radius of curvature of its convex surface is between 0.16F and 0.3F, and that of its concave surface is between 0.4F and F, in which each negative component is between 0.01F and 0.05F thick at the axis, the radius of curvature of its convex surface is between 0.13F and 0.28F, and that of its concave surface is between 0.1F and 0.2F, in which the two negative components are spaced apart by between 0.08F and 0.2F and are spaced from the respective positive components by between zero and 0.05F, and in which each positive component includes a positive element having a refractive index between 1.43 and 1.58 and a dispersive index between 50 and 80, and each negative component includes a negative element having a refractive index between 1.6 and 2.0 and a dispersive index between 25 and 36.

3. A photographic objective comprising two meniscus negative inner components concave toward each other and enclosing a central airspace and diaphragm therein and two meniscus positive outer components concave toward the negative components and all axially aligned and airspaced apart, characterized by both positive components being compound and each consisting of a negative element facing the negative components and a positive element cemented thereto, by the curvature of each cemented surface so formed being between $-1/F$ and $+2/F$ where $F$ is the focal length of the objective and where the $-$ and $+$ values indicate curvatures respectively convex and concave toward the negative components, and by the two negative elements having refractive indices greater than those of the respective positive elements cemented thereto by between 0.08 and 0.25 and dispersive indices which are between 70% and 130% on the average of those of said respective positive elements.

4. An objective according to claim 3 in which each positive component is between 0.05F and 0.2F thick at the axis, the radius of curvature of its convex surface is between 0.16F and 0.3F, and that of its concave surface is between 0.4F and F, in which each negative component is between 0.01F and 0.05F thick at the axis, the radius of curvature of its convex surface is between 0.13F and 0.28F, and that of its concave surface is between 0.1F and 0.2F, in which the two negative components are spaced apart by between 0.08F and 0.2F and are spaced from the respective positive components by between zero and 0.05F, and in which each positive component includes a positive element having a refractive index between 1.43 and 1.58 and a dispersive index between 50 and 80, and each negative component includes a negative element having a refractive index between 1.6 and 2.0 and a dispersive index between 25 and 36.

5. A photographic objective substantially according to the following specifications:

| Lens | N | V | Radii | Thicknesses |
|---|---|---|---|---|
| I | 1.50 | 67. | $R_1=+0.2\ F$ | $t_1=0.08\ F$ |
| II | 1.62 | 60. | $R_2=+1.0\ F$ | $t_2=0.03\ F$ |
|  |  |  | $R_3=+0.5\ F$ | $s_1=0.02\ F$ |
| III | 1.72 | 29. | $R_4=+0.2\ F$ | $t_3=0.02\ F$ |
|  |  |  | $R_5=+0.12\ F$ | $s_2=0.13\ F$ |
| IV | 1.72 | 29. | $R_6=-0.13\ F$ | $t_4=0.03\ F$ |
|  |  |  | $R_7=-0.2\ F$ | $s_3=0.03\ F$ |
| V | 1.50 | 67. | $R_8=-0.7\ F$ | $t_5=0.09\ F$ |
|  |  |  | $R_9=-0.2\ F$ |  | where the lens elements are numbered in the first column in order from the front to the rear of the objective and the corresponding refractive indices N for the D line of the spectrum and the dispersive indices V are given in the next two columns, where the radii of curvature R of the lens surfaces, the thicknesses $t$ of the lens elements and the spaces $s$ between the lens components are given in the last two columns, where the $+$ and $-$ values of the radii R denote surfaces respectively convex and concave to the front of the objective, and where F is the focal length of the objective.

6. A photographic objective substantially according to the following specifications:

| Lens | N | V | Radii | Thicknesses |
|---|---|---|---|---|
| I | 1.50 | 66. | $R_1=+0.2\ F$ | $t_1=0.08\ F$ |
| II | 1.62 | 60. | $R_2=+0.8\ F$ | $t_2=0.02\ F$ |
|  |  |  | $R_3=+0.5\ F$ | $s_1=0.02\ F$ |
| III | 1.75 | 28. | $R_4=+0.2\ F$ | $t_3=0.03\ F$ |
|  |  |  | $R_5=+0.12\ F$ | $s_2=0.15\ F$ |
| IV | 1.75 | 28. | $R_6=-0.13\ F$ | $t_4=0.03\ F$ |
|  |  |  | $R_7=-0.2\ F$ | $s_3=0.004\ F$ |
| V | 1.67 | 47. | $R_8=-0.8\ F$ | $t_5=0.03\ F$ |
| VI | 1.50 | 66. | $R_9=+3\ F$ | $t_6=0.11\ F$ |
|  |  |  | $R_{10}=-0.2\ F$ |  | where the lens elements are numbered in the first column in order from the front to the rear of the objective and the corresponding refractive indices N for the D line of the spectrum and the dispersive indices V are given in the next two columns, where the radii of curvature R of the lens surfaces, the thicknesses $t$ of the lens elements and the spaces $s$ between the lens components are given in the last two columns, where the $+$ and $-$ values of the radii R denote surfaces respectively convex and concave to the front of the objective, and where F is the focal length of the objective.

MAXIMILIAN J. HERZBERGER.

REFERENCES CITED

The following references are of record in the file of this patent:

UNITED STATES PATENTS

| Number | Name | Date |
|---|---|---|
| 1,777,262 | Hasselkus et al. | Sept. 30, 1930 |
| 2,031,792 | Richter | Feb. 25, 1936 |
| 2,325,275 | Rayton | July 27, 1943 |
| 2,383,115 | Durand | Aug. 21, 1945 |

FOREIGN PATENTS

| Number | Country | Date |
|---|---|---|
| 472,191 | Great Britain | Sept. 20, 1937 |
| 487,453 | Great Britain | June 21, 1938 |